US008712995B2

(12) United States Patent
Marum et al.

(10) Patent No.: US 8,712,995 B2
(45) Date of Patent: Apr. 29, 2014

(54) SCORING RECORDS FOR SORTING BY USER-SPECIFIC WEIGHTS BASED ON RELATIVE IMPORTANCE

(75) Inventors: Matthew G. Marum, Cary, NC (US); Samuel G. Padgett, Raleigh, NC (US); Steven K. Speicher, Holly Springs, NC (US); Michael J. Tabb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/598,659

(22) Filed: Aug. 30, 2012

(65) Prior Publication Data
US 2014/0067798 A1 Mar. 6, 2014

(51) Int. Cl.
*G06F 17/30* (2006.01)

(52) U.S. Cl.
USPC ........... 707/713; 707/706; 707/722; 707/736; 707/758; 707/781

(58) Field of Classification Search
USPC ................................................ 707/600–899
See application file for complete search history.

(56) References Cited

U.S. PATENT DOCUMENTS 6,108,630 A * 8/2000 Kuechler et al. .............. 704/270
2011/0270845 A1 11/2011 Lin et al.
2011/0307408 A1 12/2011 Gates

OTHER PUBLICATIONS

Liang Gou, et al.; "Social Network Document Ranking"; JCDL '10; Gold Coast, Queensland, Australia; Jun. 21-25, 2010; pp. 313-322; Copyright 2010.

* cited by examiner

*Primary Examiner* — Isaac M Woo
(74) *Attorney, Agent, or Firm* — Daniel R. Simek; Matthew F. Mottice

(57) ABSTRACT

Embodiments of the present invention provide a system, method, and program product for managing records in a storage device. Responsive to receiving a search query, a computer determines a result set for the search query including one or more one records from a record storage device, and determines whether the one or more records contain a link to a profile associated to an individual in a corporate directory. Responsive to determining that the one or more records contain the link to the profile associated with the individual in the corporate directory, the computer accesses the corporate directory and determines a corporate standing of the individual in the corporate directory. Responsive to determining the corporate standing of the individual in the corporate directory, the computer determines a relevancy score for the corporate standing of the individual in the corporate directory.

17 Claims, 5 Drawing Sheets

SAMPLE ALGORITHM
400

```
function scoreRecord(record)
  score = 0;
  for i = 0 to length (record.links):
    # Scores the quality of the link
    score += scoreLink(record.links[i]) ;
  for i = 0 to length (record.mentions):
    # Uses the users place in the hierarchy as its score
    score += scoreUser(record.mentions[i].user);
  for i = 0 to length (record.history):
    # Uses historical data about who has viewed the record
    score += scoreUser(record.history[i].user);
  return score;
end function function scoreUser(user)
  level = MAX_LEVELS
  manager = user.manager;
  while manager != null
    level--;
    manager = manager.manager;
  end while;
end function function scoreLink(link)
  score = 0;
  if (link.type == DEFECT)
    score = 20;
  else if (link.type == BUILD_TRACKING_ITEM)
    score = 10;
  else if (link.type == ENHANCEMENT)
    score = 15;
  else
    score = 5;
  return score + scoreRecord(link.source);
end function
```

SCORING RECORDS FOR SORTING BY USER-SPECIFIC WEIGHTS BASED ON RELATIVE IMPORTANCE

FIELD OF THE INVENTION

The present invention relates generally to information management systems, and more particularly to managing records in a storage device based on importance.

BACKGROUND

Typically, in corporations, large volumes of important information may be stored in a system or storage device. Such systems may include defect tracking systems, email databases, and invention disclosures. When performing a search query in these systems, the potential result set may include a substantial number of records returned. Most systems allow a way of sorting the result set, but the sorting is usually limited to the record columns and having their corresponding values sorted in ascending or descending order. When viewing large result sets, traditional sorting methods may not always reveal which records in the result set are the most important.

In some current systems, a search query may be run and the result set sorted by severity. If the result set is large, the sorting may still result in a large number of records having the same severity level. In this situation, there is no way to quickly determine which records in the result set are the most important. The user would have to manually go through each record in the result set and determine the importance of each record relative to the other records in the result set.

SUMMARY

Embodiments of the present invention provide a system, method, and program product for managing records in a storage device. Responsive to receiving a search query, a computer determines a result set for the search query including one or more one records from a record storage device, and determines whether the one or more records contain a link to a profile associated to an individual in a corporate directory. Responsive to determining that the one or more records contain the link to the profile associated with the individual in the corporate directory, the computer accesses the corporate directory and determines a corporate standing of the individual in the corporate directory. Responsive to determining the corporate standing of the individual in the corporate directory, the computer determines a relevancy score for the corporate standing of the individual in the corporate directory.

BRIEF DESCRIPTION OF THE FIGURES

FIG. 4 depicts an example algorithm that performs the process described in relevancy score calculation program.

DETAILED DESCRIPTION

Figure 1:
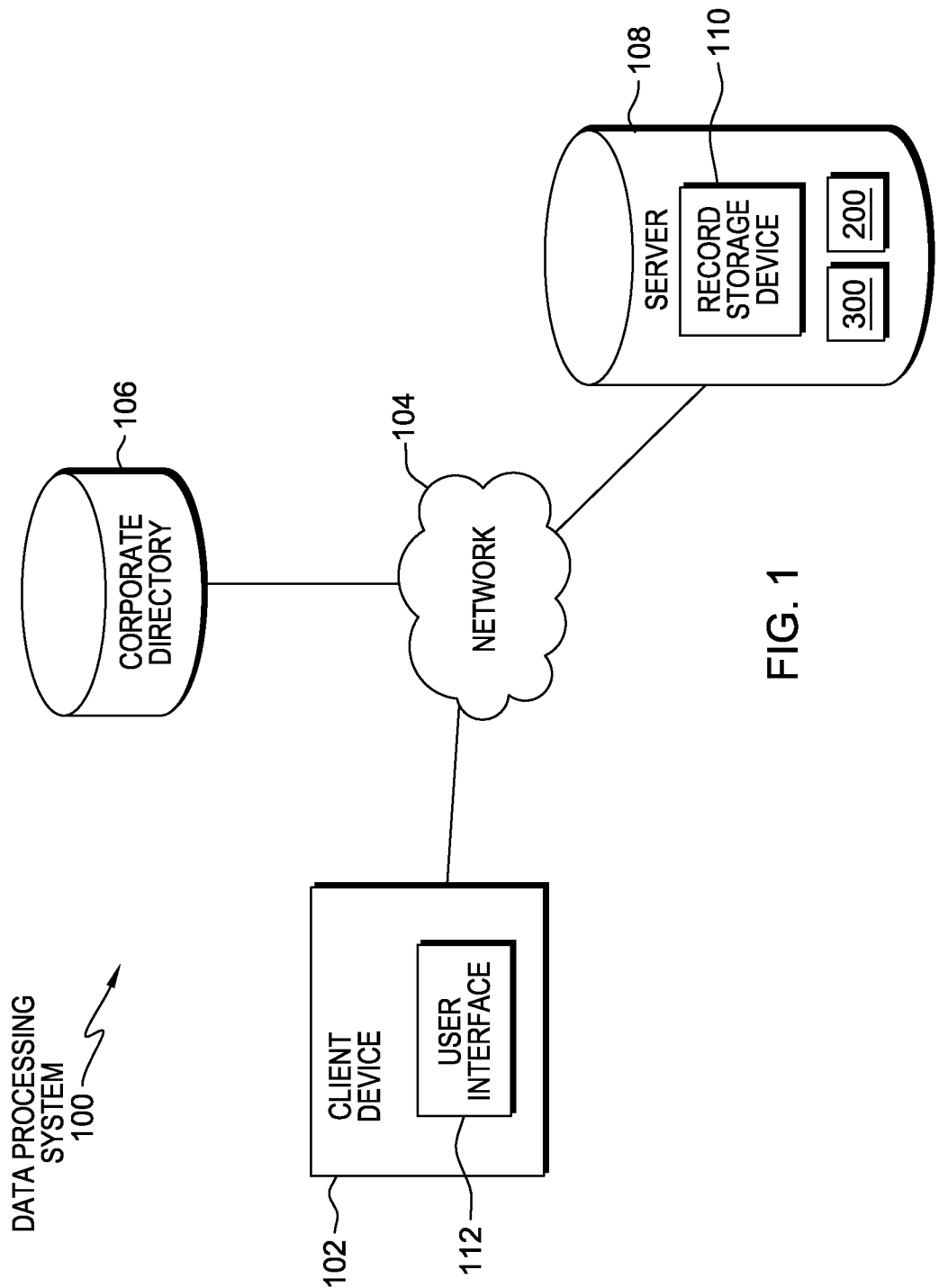
FIG. 1 is a pictorial representation of a data processing system for a client device requesting a search query on a record storage device in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.,) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a block diagram illustrating a data processing system 100 in accordance to one embodiment of the present invention.

Data processing system 100 includes a client device 102, a corporate directory 106, and a server 108 which are connected through a network 104. Client device 102 may be workstations, personal computers, personal digital assistants, mobile phones, and other devices executing program instructions. A user interface 112 is located on client device 102 and may exist in the form of operating system software, which may be Windows, LINUX, or other systems that include application software such as internet applications and web browsers. In an example, user interface 112 includes applications that allow user interface 112 to access a record storage device 110 on server 108 through network 104. In an example, user interface 112 may include, at least in part, a defect tracking system which may access defect records on record storage device 110. Client device 102 can be used to access content on corporate directory 106 and server 108 through network 104.

In one embodiment, data processing system 100 includes network 104, which provides communication between devices such as, but not limited to client device 102, corporate directory 106 and server 108. Network 104 may include connections such as wiring, wireless communication link, fiber optic cables, and other forms of communication. Network 104 may allow elements of data processing system 100 to access content through a plurality of methods, including the internet, an intranet connection, telecommunications service provider, local area connection, and others.

In an example, corporate directory 106 is a database including a listing of all employees of a company and information relative to their importance in the company. Corporate directory 106 may exist in the form of a remote server, database, or other means of storing information. In an embodiment, corporate directory may include, but is not limited to the positions of all employees in a company, the corporate standing of the employee, or other details corresponding to an employee in a company. The corporate standing of an employee may be based a least in part on the position that the employee holds in the company relative to other employees. In an example, corporate directory 106 includes of a listing of employees in a company, including the Chief Executive Officer (CEO), executives, managers, developers, and all other employees in a company.

In an embodiment, server 108 contains record storage device 110 and is connected to client device 102 and corporate directory 106 through network 104. Examples of server 108 include application servers, communications servers, database servers, and other servers. In general, client device 102 and server 108 may be any programmable electronic devices as described in further detail with regard to FIG. 5. In another embodiment, client device 102 and/or server 108 represents a "cloud" of computers interconnected by one or more networks, where client device 102 and/or server 108 is a primary server for a computer system utilizing clustered computers and components to act as a single pool of seamless resources when accessed through network 104. For example, this implementation may be preferred for data centers and for cloud computing applications. Server 108 includes a relevancy score calculation program 200 for calculating a relevancy score for a record in record storage device 110. In an example, server 108 includes search query sort program 300 for sorting the result set of a search query responsive to relevancy scores. The programs described in FIGS. 2 and 3 may be stored on server 108 in the form of programs in the computing system of server 108. However, in other examples, the programs may be stored on remote storage devices, servers, and other methods. In an example, record storage device 110 may be any system or storage device where information is stored and can be searched. Record storage device 110 may be located on server 108, or on a separate server or storage device which is connected to server 108 through network 104. In exemplary embodiments, server 108 accesses information on record storage device 110 and corporate directory 106 in accordance with the requirements of relevancy score calculation program 200.

Figure 2:
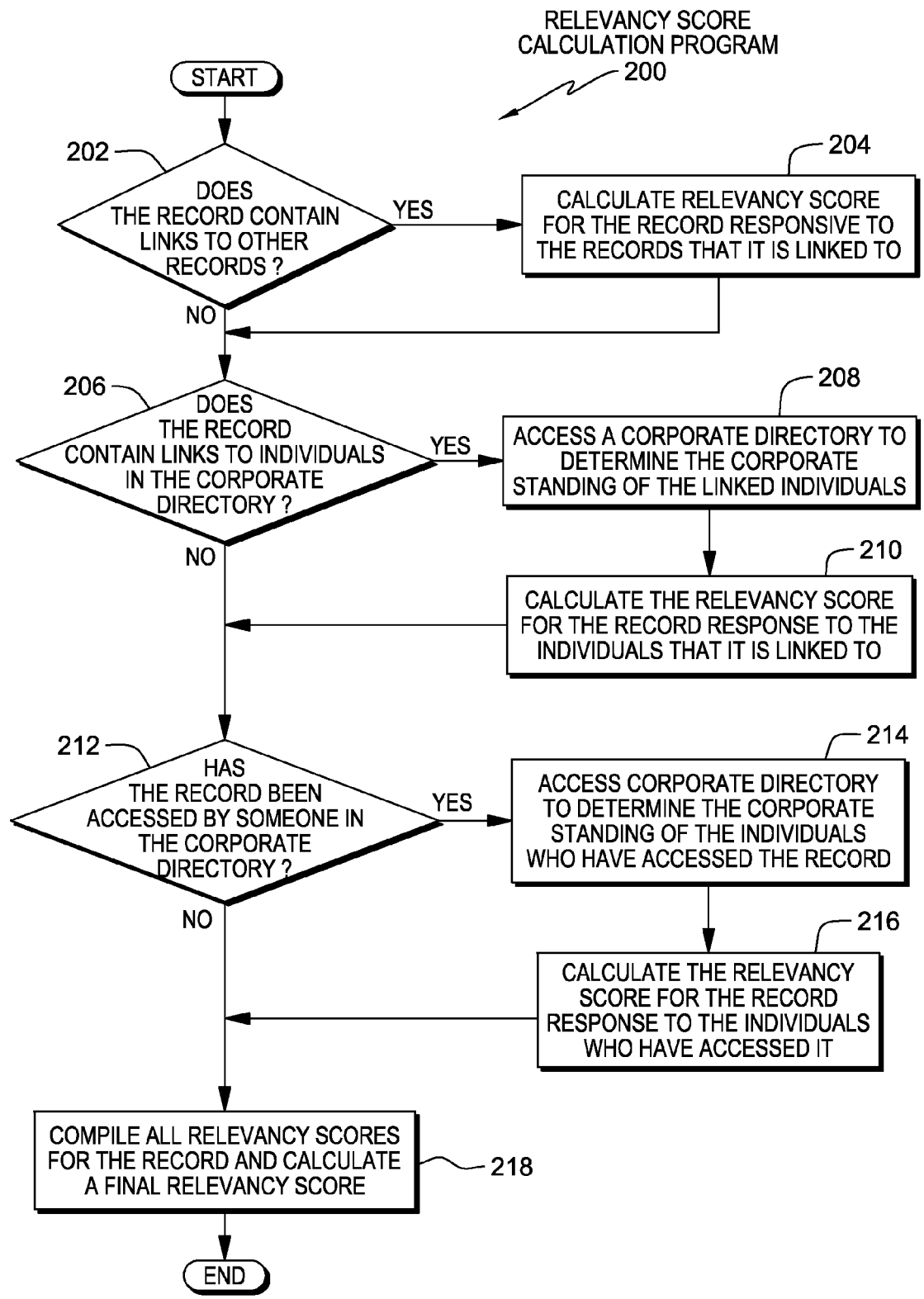
FIG. 2 is a flowchart depicting the steps of a program for calculating relevancy scores for a record on a record storage device in accordance with an embodiment of the present invention.

FIG. 2 is a flowchart of an exemplary embodiment of relevancy score calculation program 200. Relevancy score calculation program 200 may be initiated when server 108 receives a request to run a search query on a record storage device 110. In examples where the result set returned from a search query is greater than one result, relevancy score calculation program 200 repeats for each result in the result set. In step 202, relevancy score calculation program 200 determines if the record contains any links to other records in record storage device 110. If relevancy score calculation program 200 determines that the record does contain a link to at least one other record in record storage device 110 (positive decision of 202), then relevancy score calculation program 200 calculates a relevancy score for the record responsive to the other records that the record is linked to (step 204). The relevancy score of a record denotes the importance of that record, and allows the record to be compared to other records. In an example, when a result set is returned from a search query, the relevancy score allows for the result set to be sorted by importance. In some examples of record storage device 110, records have an ability to be linked to other records within the record storage device 110. Relevancy score calculation program 200 may access these links and determine the type of record, which has been linked to and to determine the priority or importance of the linked record. In an example, a record may be linked to a record in record storage device 110 which is marked as escalation. In this example, relevancy score calculation program 200 may record this information and use it to calculate the relevancy score for the linked records. In this example, an escalation record is a higher priority than other non-escalation records, and increases the relevancy score. Relevancy score calculation program 200 takes into account the quality of the linked record (importance, priority), as well as the number of linked records. In this example, a record that is linked to five escalation records has a better relevancy score than a record that is linked to two escalation records.

In step 206, relevancy score calculation program 200 determines whether the record contains a link to a profile associated with an individual in corporate directory 106. If relevancy score calculation program 200 determines that the record does contain a link to a profile associated with an individual in corporate directory 106 (positive decision of 206), relevancy score calculation program 200 accesses corporate directory 106 to determine the corporate standing of the linked profile (step 208). In step 210, relevancy score calculation program 200 calculates a relevancy score for the record responsive to the profiles that are linked to the record. In some examples, records in record storage device 110 have the capability to be linked to profiles associated with individuals on corporate directory 106. Relevancy score calculation program 200 may access these linked profiles to determine the corporate standing of the individuals associated with these profiles. The corporate standing of an individual is based at least on part on the position in the company of an individual listed in corporate directory 106. In an example, if a record where the Chief Executive Officer (CEO) is linked is compared to a record where a developer is linked, the record in which the CEO was mentioned would have a higher relevancy score because of the CEO's higher corporate standing. Examples of rating methods for corporate standing may include a numerical scale where the individuals with the highest corporate standing in corporate directory 106 are given the highest score, a numerical scale where the individuals with the highest corporate standing in corporate directory 106 are given the lowest score, or other methods of assigning a rating to member of the corporate directory 106.

In an example of a rating method where the most important individuals in corporate directory 106 are given the highest score, a first record may be linked to two managers who have a score of 7, and three developers who have a score of 3. This results in an average score of 4.6 ((7+7+3+3+3)/5) for the record. In the same example, a second record may be linked to three managers who have a score of 7, an executive who has a score of 8, and two developers who have a score of 3. This results in an average score of 5.83 ((8+7+7+7+3+3))/6) for the record. When comparing both records in the example, the second record has a higher score and therefore relevancy score calculation program 200 would calculate a higher relevancy score for the linked profiles to the second record than the first record.

In step 212, relevancy score calculation program 200 determines whether the record has been accessed by any individuals in corporate directory 106. If relevancy score calculation program 200 determines that the record has been accessed by someone from the corporate directory, relevancy score calculation program 200 accesses corporate directory 106 to determine the corporate standing of the individuals that have accessed the record (step 214). In step 216, relevancy score calculation program 200 calculates a relevancy score for the record responsive to the individuals that have accessed the record. Individuals in corporate directory 106 may access records located on record storage device 110, and when this happens record storage device 110 may record which individuals from corporate directory 106 have accessed a record. In some examples, record storage device 110 maintains historical data for records comprising at least in part information regarding which individuals from corporate directory 106 have accessed a particular record. Relevancy score calculation program 200 may access the profiles associated with the individuals who have accessed records on record storage device 110 to determine the corporate standing of the individual. In an example, if a record which was accessed by the CEO is compared to a record that was accessed by a developer, the record that was accessed by the CEO would receive a higher relevancy score because of the CEO's higher corporate standing. In an example of a rating method where the most important individuals in corporate directory 106 are given the highest score, a first record may have been accessed by one executive who has a score of 8, two managers who have a score of 7 and three developers who have a score of 3. This results in an average score of 5.17 ((8+7+7+3+3+3)/6) for the record. In the same example, a second record may have been accessed by two managers who have a score of 7 and two developers who have a score of 3. This results in an average score of 5 ((7+7+3+3)/4) for the record. When comparing both records in the example, the first record has a higher score and therefore relevancy score calculation program 200 would calculate a higher relevancy score for the individuals who have accessed the first record compared to the second record.

In step 218, relevancy score calculation program 200 compiles all relevancy scores corresponding to a record and calculates a final relevancy score for the record. The final relevancy score compiled by relevancy score calculation program 200 includes the relevancy score sub-calculations that occur in relevancy score calculation program 200. In an example, the relevancy score sub-calculations are, at least in part, the relevancy score for the linked records (step 204), the relevancy score for linked profiles (step 210), and the relevancy score for accessed records (step 216). In an example, the final relevancy score may be calculated using a weighted algorithm which takes into account all sub-calculations from relevancy score calculation program 200. An example of the weighted algorithm may assign equal value to each relevancy score sub-calculation, where each relevancy score sub-calculation equates to one third of the final relevancy score. This weighted algorithm may be defined or modified by user preferences. In another example, the weighted algorithm may be defined by the user to have the relevancy score sub-calculation for the linked profiles to be half of the final relevancy score, and the remaining relevancy score sub-calculations to be a quarter of the final relevancy score. In this example the weighted algorithm could be 0.50*(linked profiled score)+ 0.25*(linked records score)+0.25*(accessed records score) =final relevancy score. In examples where the result set of a search query includes more than one record relevancy score calculation program 200 will repeat until every record in the search query has a final relevancy score.

Figure 3:
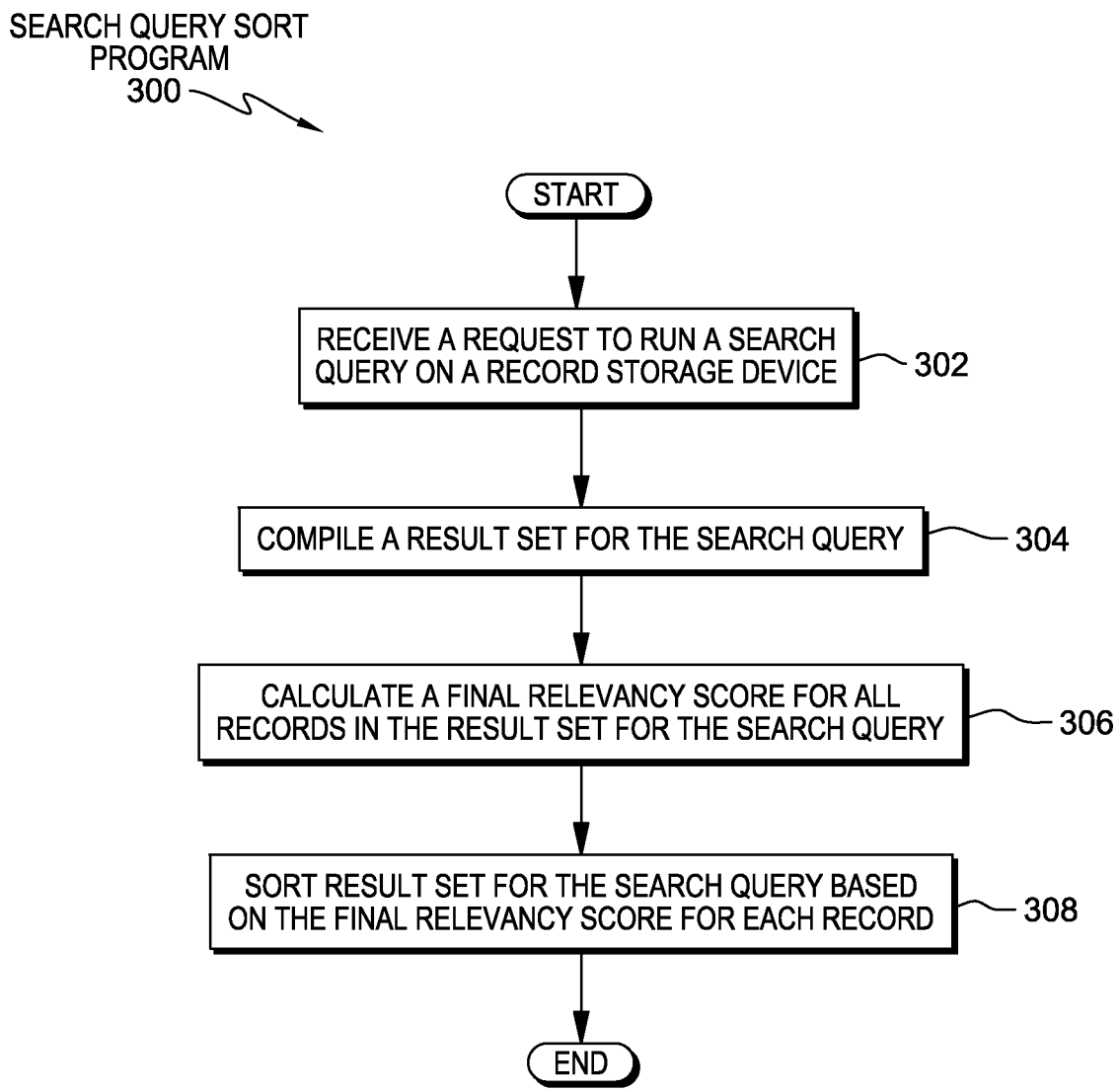
FIG. 3 is a flowchart depicting the steps of a program for sorting a search query on a record storage device by the relevancy scores of records in accordance with an embodiment of the present invention.

FIG. 3 is a flowchart of search query sort program 300. In step 302 search query sort program 300 receives a request to run a search query on record storage device 110. Search query sort program 300 compiles a result set for the search query (step 304). In step 306, search query sort program 300 calculates a final relevancy score for all records in the result set for the search query. Search query sort program 300 sorts the result set for the search query based on the final relevancy score for each record (step 308).

In some examples, search query sort program 300 returns a result set from a search query that is sorted by the final relevancy score which was calculated in step 218 of FIG. 2. In step 302, search query sort program 300 receives a request to run a search query on record storage device 110 from client device 102. In an example, an application on user interface 112 of client device 102 accesses record storage device 110 and sends a search query request. In step 304, search query sort program 300 accesses record storage device 110 and compiles a result set of records responsive to the search query received in step 302. In step 306, search query sort program 300 accesses the relevancy score sub-calculations for the record which were determined in FIG. 2. In an example, the calculation of a final relevancy score in step 306 may be comprised, at least in part, by the steps of relevancy score calculation program 200 in FIG. 2. The final relevancy score for a record is composed of relevancy score sub-calculations comprising at least in part, relevancy score for the linked records, the relevancy score for linked profiles, and the relevancy score for accessed records which are input into an algorithm to calculate the final relevancy score for the record. In some current examples, a search query may be returned and the records in the result set may be sorted by severity. However, many records in the result set may have the same severity and therefore it is difficult to determine which record is the most important. In step 308, search query sort program 300 sorts the records in the result set so that the most important records are indicated for the user.

FIG. 4 depicts an example algorithm 400 that performs the process described in relevancy score calculation program 200. Example algorithm 400 may determine the relevancy score of a record responsive to the records linked, the profiles in corporate directory 106 linked, and the individuals from corporate directory 106 who have previously accessed the record.

Figure 5:
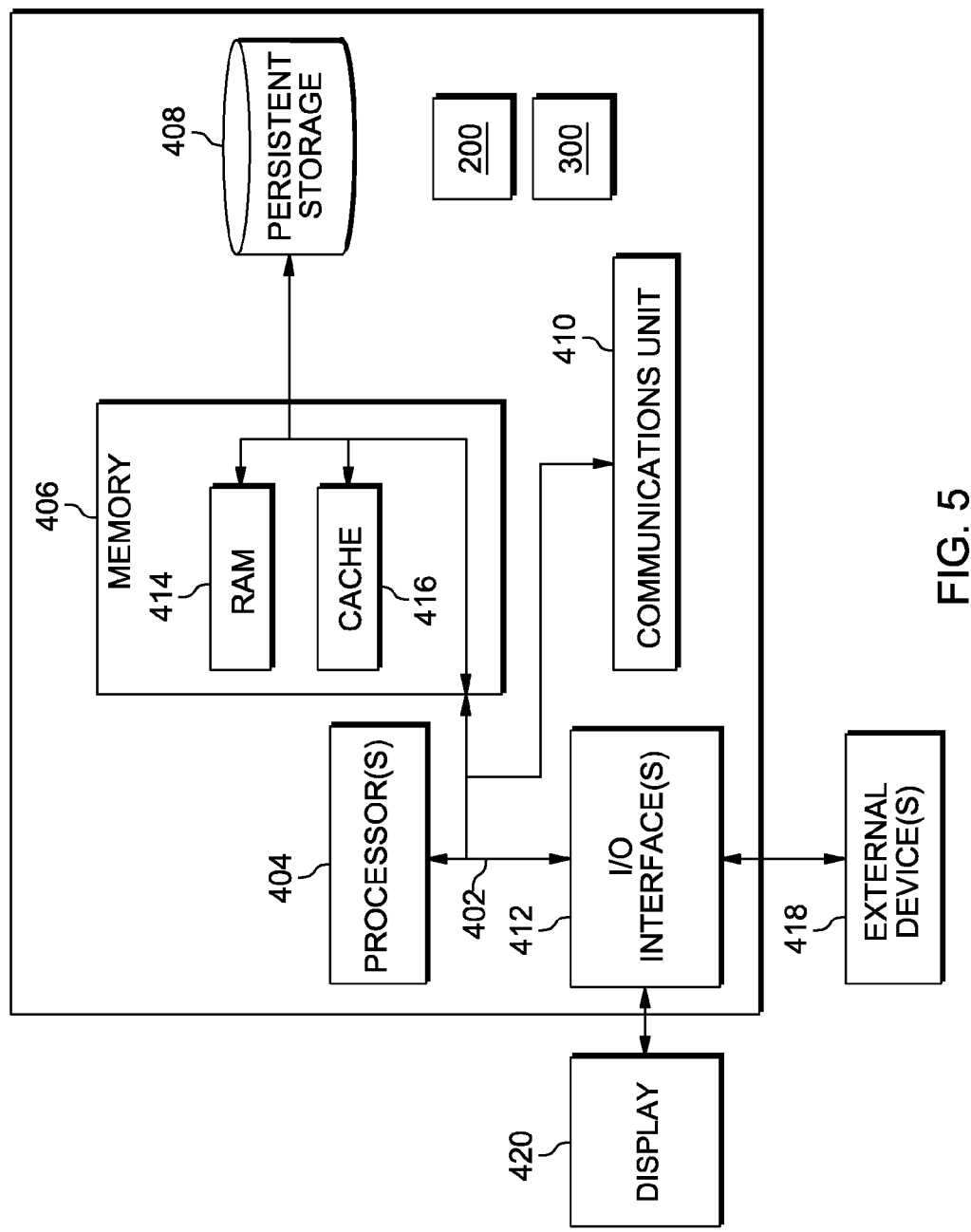
FIG. 5 depicts a block diagram of components of the computer processing system executing the intelligent mapping program, in accordance with an embodiment of the present invention.

FIG. 5 depicts a block diagram of components of client device 102 and server 108 of computer processing system 100 in accordance with an illustrative embodiment. It should be appreciated that FIG. 5 provides only an illustration of one implementation and does not imply any limitations with regard to the environment in which different embodiments may be implemented. Many modifications to the depicted environment may be made.

Client device 102 and server 108 include communications fabric 402, which provides communications between computer processor(s) 404, memory 406, persistent storage 408, communications unit 410, and input/output (I/O) interface(s) 412.

Memory 406 and persistent storage 408 are examples of computer-readable tangible storage devices and media. Memory 406 may be, for example, one or more random access memories (RAM) 414, cache memory 416, or any other suitable volatile or non-volatile storage device.

Relevancy score calculation program 200 and search query sort program 300 are stored in persistent storage 408 for execution by one or more of the respective computer processors 404 via one or more memories of memory 406. In the embodiment illustrated in FIG. 5, persistent storage 408 includes flash memory. Alternatively, or in addition to flash memory, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices, including resources of client device 102, server 108 and corporate directory 106. In these examples, communications unit 410 includes one or more network interface cards. Communications unit 410 may provide communications through the use of either or both physical and wireless communications links. Relevancy score calculation program 200 and search query sort program 300 may be downloaded to persistent storage 408 through communications unit 410.

I/O interface(s) 412 allows for input and output of data with other devices that may be connected to computer processing system 100. For example, I/O interface 412 may provide a connection to external device(s) 418 such as a keyboard, keypad, a touch screen, and/or some other suitable input device. I/O interface(s) 412 may also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing records in a storage device comprising:
   determining a result set for a search query including one or more one records from a record storage device;
   determining whether the one or more records contain a link to a profile associated to an individual in a corporate directory;
   accessing the corporate directory and determining a corporate standing of the individual in the corporate directory;

determining a relevancy score for the corporate standing of the individual in the corporate directory;

determining whether the one or more records are linked to an additional record in the record storage device;

accessing the record storage device and determining a priority level of the additional record; and determining a relevancy score for the priority level of the additional record, wherein at least one of the steps is carried out using a computing device.

2. The method of claim 1, further comprising:

receiving a request to run a search query on the record storage device located on a server.

3. The method of claim 1, further comprising:

determining whether at least one individual in the corporate directory previously accessed the one or more records;

accessing the corporate directory and determining the corporate standing of the at least one individual in the corporate directory who previously accessed the one or more records; and determining a relevancy score for the corporate standing of the at least one individual that previously accessed the one or more records.

4. The method of claim 1, wherein the corporate standing of the individual in the corporate directory is based at least in part on the position in a company of the individual in the corporate directory.

5. The method of claim 1, further comprising:

determining a final relevancy score by compiling the relevancy scores of the one or more records corresponding to at least in part linked profiles, linked records, and accessed records and imputing the relevancy scores into an algorithm; and sorting the one or more records in the result set in terms of final relevancy score.

6. The method of claim 1 wherein the record storage device is not located on the server.

7. A computer program product for managing records in a storage device, the computer program product comprising:

one or more computer-readable tangible storage devices and program instructions stored on the one or more computer-readable tangible storage devices, the program instructions comprising:

program instructions to determine a result set for a search query including one or more one records from a record storage device;

program instructions to determine whether the one or more records contain a link to a profile associated to an individual in a corporate directory;

program instructions to access the corporate directory and determine a corporate standing of the individual in the corporate directory;

program instructions to determine a relevancy score for the corporate standing of the individual in the corporate directory;

program instructions to determine whether the one or more records are linked to an additional record in the record storage device;

program instructions to access the record storage device and determining a priority level of the additional record; and program instructions to determine a relevancy score for the priority level of the additional record.

8. The computer program product of claim 7, further comprising program instructions, stored on the one or more computer-readable tangible storage devices, to:

receive a request to run a search query on the record storage device located on a server.

9. The computer program product of claim 7, further comprising program instructions, stored on the one or more computer-readable tangible storage devices, to:

determine whether at least one individual in the corporate directory previously accessed the one or more records;

access the corporate directory and determining the corporate standing of the at least one individual in the corporate directory who previously accessed the one or more records; and determine a relevancy score for the corporate standing of the at least one individual that previously accessed the one or more records.

10. The computer program product of claim 7, wherein the program instructions to determine corporate standing of the individual in the corporate directory is based at least in part on the position in a company of the individual in the corporate directory.

11. The computer program product of claim 7, further comprising program instructions, stored on the one or more computer-readable tangible storage devices, to:

determine a final relevancy score by compiling all the relevancy scores of the one or more records corresponding to at least in part linked profiles, linked records, and accessed records and imputing the relevancy scores into an algorithm; and sort the one or more records in the result set in terms of final relevancy score.

12. A computer system for managing records in a storage device, the computer system comprising:

one or more computer processors;

one or more computer-readable tangible storage devices;

program instructions stored on the one or more computer-readable tangible storage devices for execution by at least one of the one or more processors, the program instructions comprising:

program instructions to determine a result set for a search query including one or more one records from a record storage device;

program instructions to determine whether the one or more records contain a link to a profile associated to an individual in a corporate directory;

program instructions to access the corporate directory and determine a corporate standing of the individual in the corporate directory;

program instructions to determine a relevancy score for the corporate standing of the individual in the corporate directory;

program instructions to determine whether the one or more records are linked to an additional record in the record storage device;

program instructions to access the record storage device and determining a priority level of the additional record; and program instructions to determine a relevancy score for the priority level of the additional record.

13. The computer system of claim 12, further comprising program instructions, stored on the one or more computer-readable tangible storage device for execution by at least one of the processors, to:

receive a request to run the search query on the record storage device located on a server.

14. The computer system of claim 12, further comprising program instructions, stored on the one or more computer-readable tangible storage device for execution by at least one of the processors, to:

determine whether at least one individual in the corporate directory previously accessed the one or more records;

access the corporate directory and determining the corporate standing of the at least one individual in the corporate directory who previously accessed the one or more records; and determine a relevancy score for the corporate standing of the at least one individual that previously accessed the one or more records.

15. The computer system of claim 12, wherein the program instructions to determine corporate standing of the individual in the corporate directory is based at least in part on the position in a company of the individual in the corporate directory.

16. The computer system of claim 12, further comprising program instructions, stored on the one or more computer-readable tangible storage device for execution by at least one of the processors, to:

determine a final relevancy score by compiling all the relevancy scores of the one or more records corresponding to at least in part linked profiles, linked records, and accessed records and imputing the relevancy scores into an algorithm; and sort the one or more records in the result set in terms of final relevancy score.

17. The computer system of claim 12 wherein the record storage device is not located on the server.

* * * * *